United States Patent
Cheng et al.

(10) Patent No.: US 10,797,761 B2
(45) Date of Patent: Oct. 6, 2020

(54) METHOD AND DEVICE FOR SENDING AND RECEIVING INFORMATION

(71) Applicant: HUAWEI TECHNOLOGIES CO., LTD., Shenzhen, Guangdong (CN)

(72) Inventors: Yan Cheng, Beijing (CN); Lixia Xue, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/995,666

(22) Filed: Jun. 1, 2018

(65) Prior Publication Data
US 2018/0278300 A1 Sep. 27, 2018

Related U.S. Application Data

(63) Continuation of application No. PCT/CN2016/107122, filed on Nov. 24, 2016.

(30) Foreign Application Priority Data

Dec. 4, 2015 (CN) .......................... 201501884921.3

(51) Int. Cl.
*H04B 7/0413* (2017.01)
*H04L 5/14* (2006.01)
(Continued)

(52) U.S. Cl.
CPC ......... *H04B 7/0413* (2013.01); *H04L 5/0048* (2013.01); *H04L 5/1469* (2013.01);
(Continued)

(58) Field of Classification Search
CPC . H04L 5/001; H04L 5/055; H04L 5/14; H04L 1/1861; H04L 5/0053;
(Continued)

(56) References Cited

U.S. PATENT DOCUMENTS

2015/0103704 A1 4/2015 Forest
2015/0201431 A1* 7/2015 Um .................. H04W 84/12
370/280
(Continued)

FOREIGN PATENT DOCUMENTS

CN 103856907 A 6/2014
CN 105099631 A 11/2015
(Continued)

OTHER PUBLICATIONS

Author Unknown, Way Forward on supplemental downlink for TD-LTE in Rel.12, Mar. 6, 2016, pp. 1-7 (Year: 2016).*
(Continued)

*Primary Examiner* — Christopher M Crutchfield
(74) *Attorney, Agent, or Firm* — Womble Bond Dickinson (US) LLP (57) ABSTRACT

The present disclosure relates to a method and a device for sending and receiving information. The method includes: determining a frame structure of a serving cell, where a radio frame corresponding to the frame structure includes at least one first special subframe, remaining subframes are downlink subframes, and the first special subframe includes symbols used for uplink transmission and downlink transmission, and a GP; and sending and receiving information in the serving cell based on the frame structure. In the technical solution, because the radio frame structure includes the first special subframe, when spectrum resources are maximally applied to downlink data service transmission, not only performance of massive MIMO is improved, but also the serving cell is enabled to work independently.

17 Claims, 2 Drawing Sheets

(51) Int. Cl.
*H04L 5/00* (2006.01)
*H04W 28/06* (2009.01)
*H04W 72/04* (2009.01)

(52) U.S. Cl.
CPC ..... *H04W 28/065* (2013.01); *H04W 72/0406* (2013.01); *H04L 5/0044* (2013.01); *H04L 5/0051* (2013.01); *H04L 5/0055* (2013.01); *H04L 5/0092* (2013.01); *H04W 72/0446* (2013.01)

(58) Field of Classification Search
CPC .............. H04L 5/1469; H04W 72/042; H04W 72/0446; H04W 72/0406
See application file for complete search history.

(56) References Cited

U.S. PATENT DOCUMENTS

| | | | | |
|---|---|---|---|---|
| 2016/0036581 | A1* | 2/2016 | Yerramalli | H04L 5/14 370/280 |
| 2016/0242153 | A1* | 8/2016 | Chen | H04L 5/0098 |
| 2016/0278089 | A1* | 9/2016 | Lee | H04B 7/2656 |
| 2016/0330737 | A1* | 11/2016 | Takeda | H04W 72/0446 |
| 2017/0041122 | A1 | 2/2017 | Li et al. | |
| 2017/0086170 | A1* | 3/2017 | Takeda | H04L 5/1415 |

FOREIGN PATENT DOCUMENTS

| | | |
|---|---|---|
| EP | 2802091 A1 | 11/2014 |
| EP | 2842350 A1 | 3/2015 |
| WO | 2013159304 A1 | 10/2013 |
| WO | 2015108007 A1 | 7/2015 |

OTHER PUBLICATIONS

Author Unknown, Text proposal for Section 5 and 6 of TR36.825, Mar. 12, 2015, pp. 1-3 (Year: 2015).*
XP050733943 RP-131781 NTT Docomo, Inc.,"Introduction of additional TDD UL/DL configuration in Rel-12",3GPP TSG-RAN #62,Dec. 3-6, 2013,Busan, Korea,total 11 pages.
XP050789203 R1-142083 Samsung,"SRS transmission for TDD-FDD CA",3GPP TSG RAN WG1 Meeting #77,Seoul, Korea, May 19-23, 2014,total 3 pages.

* cited by examiner

METHOD AND DEVICE FOR SENDING AND RECEIVING INFORMATION

CROSS-REFERENCE TO RELATED APPLICATIONS

This application is a continuation of international application No. PCT/CN2016/107122, filed on Nov. 24, 2016, which claims priority to Chinese Patent Application No. 201510884921.3, filed on Dec. 4, 2015. The disclosures of the aforementioned applications are hereby incorporated by reference in their entireties.

TECHNICAL FIELD

The present disclosure relates to the field of wireless communications technologies, and in particular, to a method and a device for sending and receiving information.

BACKGROUND

In a long term evolution (LTE) system, a radio frame includes 10 subframes. In an LTE time division duplex (TDD) system, sending and receiving data are completed at different times in a same carrier. In other words, uplink transmission and downlink transmission are distinguished by using subframe granularities in time.

Subframes in the TDD system include downlink subframes, uplink subframes, and special subframes. A special subframe includes three parts: a downlink pilot time slot (DwPTS), a guard period (GP), and an uplink pilot timeslot (UpPTS). The GP is mainly used to compensate for a downlink-to-uplink switching time and an uplink/downlink transmission delay. A system earlier than LTE Release 12 can support seven different uplink-downlink configurations. Specific configurations are shown in Table 1, where D denotes a downlink subframe, S denotes a special subframe, U denotes an uplink subframe, and 0 to 6 are uplink-downlink configuration indexes. Herein an uplink-downlink configuration with an index 0 may also be referred to as an uplink-downlink configuration 0, and the rest are similar to this. In Table 1, downlink-to-uplink switch-point periodicities in uplink-downlink configurations 0, 1, 2, and 6 are 5 ms, and downlink-to-uplink switch-point periodicities in uplink-downlink configurations 3, 4, and 5 are 10 ms.

TABLE 1

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The LTE system supports a carrier aggregation (CA) technology. To be specific, a plurality of component carriers or serving cells may be allocated to user equipment (UE) simultaneously, and used to support data transmission at a higher rate. Persons of ordinary skill in the art should understand that a serving cell is a carrier. In CA, there is one primary serving cell and at least one secondary serving cell, and a physical uplink control channel (PUCCH) carrying a hybrid automatic repeat request-acknowledgement (HARQ-ACK) is sent only in the primary serving cell.

According to a service trend in an existing mobile network, a downlink data service requirement is far higher than an uplink service requirement. As can be seen from the existing uplink-downlink configurations, an uplink-downlink configuration that can maximally apply spectrum resources to downlink data service transmission is an uplink-downlink configuration 5. As shown in Table 1, in the uplink-downlink configuration 5, a radio frame includes up to nine subframes that may be used for downlink data transmission.

To better match the service trend in the existing network, a new radio frame structure is introduced in the prior art, so that all subframes in a radio frame can be used for downlink data transmission. A specific uplink-downlink configuration of the frame structure is shown in Table 2.

TABLE 2

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| x | No uplink-to-downlink switching | D | D | D | D | D | D | D | D | D | D |

According to the uplink-downlink configuration shown in Table 2, all 10 subframes in a radio frame can be used for downlink data transmission. Therefore, spectrum resources can be maximally applied to downlink data service transmission.

However, in this uplink-downlink configuration, on one hand, because a radio frame includes only downlink subframes, a sounding reference signal (SRS) cannot be transmitted in a serving cell deployed with the uplink-downlink configuration, performance of massive multiple-input multiple-output (MIMO) in the serving cell cannot be improved through channel reciprocity, and a performance gain that massive MIMO can bring is greatly limited. On the other hand, because a radio frame includes only downlink subframes, uplink feedback information corresponding to the serving cell, including hybrid automatic repeat request-acknowledgement information, channel state information, and the like, can be fed back only by using another serving cell, and the serving cell deployed with the uplink-downlink configuration cannot work independently. In addition, from a perspective of the user equipment, the serving cell deployed with the uplink-downlink configuration can serve as a secondary serving cell only, and therefore, the serving cell deployed with the uplink-downlink configuration can serve only the user equipment having a carrier aggregation capability, and an application scenario of the uplink-downlink configuration is limited.

In summary, the new radio frame structure currently introduced for the purpose of maximally applying spectrum resources to downlink data service transmission not only limits the performance gain that massive MIMO may bring, but also makes the serving cell deployed with the uplink-downlink configuration unable to work independently.

SUMMARY

The present disclosure provides a method and a device for sending and receiving information, to resolve problems that a performance gain of massive MIMO is limited and that a serving cell cannot work independently due to introduction of a radio frame structure including only downlink subframes when spectrum resources are maximally applied to downlink data service transmission in the prior art.

According to a first aspect, a method for sending and receiving information is provided and includes:

determining a frame structure of a serving cell, where a radio frame corresponding to the frame structure includes at least one first special subframe, remaining subframes in the radio frame are downlink subframes, the first special subframe includes a symbol used for downlink transmission, a guard period (GP), and a symbol used for uplink transmission, the uplink transmission includes hybrid automatic repeat request-acknowledgement uplink control channel transmission and/or sounding reference signal (SRS) transmission, and the downlink transmission includes physical downlink shared channel transmission; and sending and receiving information in the serving cell based on the frame structure.

With reference to the first aspect, in a first possible implementation of the first aspect, the determining a frame structure of the serving cell includes:

determining the frame structure of the serving cell according to an uplink-downlink configuration of the serving cell, where an uplink-downlink configuration index corresponding to the uplink-downlink configuration is x, and x is a positive integer greater than 6.

With reference to the first aspect or the first possible implementation of the first aspect, in a second possible implementation of the first aspect, a subframe position of the at least one first special subframe in the radio frame is one or more of at least one subframe position, and the at least one subframe position is a subframe position corresponding to an uplink subframe and a special subframe in a radio frame in an uplink-downlink configuration 0.

With reference to the first aspect or the first possible implementation of the first aspect, in a third possible implementation of the first aspect, a subframe position of the at least one first special subframe in the radio frame corresponds to at least one subframe position, and the at least one subframe position is a subframe position corresponding to an uplink subframe and a special subframe in a radio frame in one of an uplink-downlink configuration 0 to an uplink-downlink configuration 6.

With reference to the first aspect or the first possible implementation of the first aspect, in a fourth possible implementation of the first aspect, the radio frame includes 10 subframes, where a subframe 0 and a subframe 5 are the downlink subframes, and a subframe 1, a subframe 2, a subframe 3, a subframe 4, a subframe 6, a subframe 7, a subframe 8, and a subframe 9 are the first special subframes; or the radio frame includes 10 subframes, where a subframe 0, a subframe 4, a subframe 5, and a subframe 9 are the downlink subframes, and a subframe 1, a subframe 2, a subframe 3, a subframe 6, a subframe 7, and a subframe 8 are the first special subframes; or the radio frame includes 10 subframes, where a subframe 0, a subframe 3, a subframe 4, a subframe 5, a subframe 8, and a subframe 9 are the downlink subframes, and a subframe 1, a subframe 2, a subframe 6, and a subframe 7 are the first special subframes; or the radio frame includes 10 subframes, where a subframe 0, a subframe 5, a subframe 6, a subframe 7, a subframe 8, and a subframe 9 are the downlink subframes, and a subframe 1, a subframe 2, a subframe 3, and a subframe 4 are the first special subframes; or the radio frame includes 10 subframes, where a subframe 0, a subframe 4, a subframe 5, a subframe 6, a subframe 7, a subframe 8, and a subframe 9 are the downlink subframes, and a subframe 1, a subframe 2, and a subframe 3 are the first special subframes; or the radio frame includes 10 subframes, where a subframe 0, a subframe 3, a subframe 4, a subframe 5, a subframe 6, a subframe 7, a subframe 8, and a subframe 9 are the downlink subframes, and a subframe 1 and a subframe 2 are the first special subframes; or the radio frame includes 10 subframes, where a subframe 0, a subframe 5, and a subframe 9 are the downlink subframes, and a subframe 1, a subframe 2, a subframe 3, a subframe 4, a subframe 6, a subframe 7, and a subframe 8 are the first special subframes.

With reference to the first aspect or the first possible implementation of the first aspect, in a fifth possible implementation of the first aspect, the radio frame includes 10 subframes, where a subframe 0 and a subframe 5 are the first special subframes, and a subframe 1, a subframe 2, a subframe 3, a subframe 4, a subframe 6, a subframe 7, a subframe 8, and a subframe 9 are the downlink subframes; or the radio frame includes 10 subframes, where a subframe 0, a subframe 4, a subframe 5, and a subframe 9 are the first special subframes, and a subframe 1, a subframe 2, a subframe 3, a subframe 6, a subframe 7, and a subframe 8 are the downlink subframes; or the radio frame includes 10 subframes, where a subframe 0, a subframe 3, a subframe 4, a subframe 5, a subframe 8, and a subframe 9 are the first special subframes, and a subframe 1, a subframe 2, a subframe 6, and a subframe 7 are the downlink subframes; or the radio frame includes 10 subframes, where a subframe 0, a subframe 5, a subframe 6, a subframe 7, a subframe 8, and a subframe 9 are the first special subframes, and a subframe 1, a subframe 2, a subframe 3, and a subframe 4 are the downlink subframes; or the radio frame includes 10 subframes, where a subframe 0, a subframe 4, a subframe 5, a subframe 6, a subframe 7, a subframe 8, and a subframe 9 are the first special subframes, and a subframe 1, a subframe 2, and a subframe 3 are the downlink subframes; or the radio frame includes 10 subframes, where a subframe 0, a subframe 3, a subframe 4, a subframe 5, a subframe 6, a subframe 7, a subframe 8, and a subframe 9 are the first special subframes, and a subframe 1 and a subframe 2 are the downlink subframes; or the radio frame includes 10 subframes, where a subframe 0, a subframe 5, and a subframe 9 are the first special subframes, and a subframe 1, a subframe 2, a subframe 3, a subframe 4, a subframe 6, a subframe 7, and a subframe 8 are the downlink subframes.

With reference to the first aspect or the first possible implementation of the first aspect, in a sixth possible implementation of the first aspect, the serving cell is a secondary serving cell of user equipment, a subframe position of the at least one first special subframe in the radio frame is one or more of at least one subframe position, and the at least one subframe position is a subframe position corresponding to a downlink subframe in a radio frame in a primary serving cell of the user equipment.

With reference to the first aspect or the first possible implementation of the first aspect, in a seventh possible implementation of the first aspect, the serving cell is a secondary serving cell of user equipment, a subframe position of the at least one first special subframe in the radio frame corresponds to at least one subframe position, and the at least one subframe position is a subframe position corresponding to a downlink subframe in a radio frame in a primary serving cell of the user equipment.

According to a second aspect, a device for sending and receiving information is provided and includes:

a processing unit, configured to determine a frame structure of a serving cell, where a radio frame corresponding to the frame structure includes at least one first special subframe, remaining subframes in the radio frame are downlink subframes, the first special subframe includes a symbol used for downlink transmission, a guard period (GP), and a symbol used for uplink transmission, the uplink transmission includes hybrid automatic repeat request-acknowledgement uplink control channel transmission and/or sounding reference signal (SRS) transmission, and the downlink transmission includes physical downlink shared channel transmission; and a transceiver unit, configured to send and receive information in the serving cell based on the frame structure.

With reference to the second aspect, in a first possible implementation of the second aspect, the processing unit is specifically configured to:

determine the frame structure of the serving cell according to an uplink-downlink configuration of the serving cell, where an uplink-downlink configuration index corresponding to the uplink-downlink configuration is x, and x is a positive integer greater than 6.

With reference to the second aspect or the first possible implementation of the second aspect, in a second possible implementation of the second aspect, a subframe position of the at least one first special subframe in the radio frame is one or more of at least one subframe position, and the at least one subframe position is a subframe position corresponding to an uplink subframe and a special subframe in a radio frame in an uplink-downlink configuration 0.

With reference to the second aspect or the first possible implementation of the second aspect, in a third possible implementation of the second aspect, a subframe position of the at least one first special subframe in the radio frame corresponds to at least one subframe position, and the at least one subframe position is a subframe position corresponding to an uplink subframe and a special subframe in a radio frame in one of an uplink-downlink configuration 0 to an uplink-downlink configuration 6.

With reference to the second aspect or the first possible implementation of the second aspect, in a fourth possible implementation of the second aspect, the radio frame includes 10 subframes, where a subframe 0 and a subframe 5 are the downlink subframes, and a subframe 1, a subframe 2, a subframe 3, a subframe 4, a subframe 6, a subframe 7, a subframe 8, and a subframe 9 are the first special subframes; or the radio frame includes 10 subframes, where a subframe 0, a subframe 4, a subframe 5, and a subframe 9 are the downlink subframes, and a subframe 1, a subframe 2, a subframe 3, a subframe 6, a subframe 7, and a subframe 8 are the first special subframes; or the radio frame includes 10 subframes, where a subframe 0, a subframe 3, a subframe 4, a subframe 5, a subframe 8, and a subframe 9 are the downlink subframes, and a subframe 1, a subframe 2, a subframe 6, and a subframe 7 are the first special subframes; or the radio frame includes 10 subframes, where a subframe 0, a subframe 5, a subframe 6, a subframe 7, a subframe 8, and a subframe 9 are the downlink subframes, and a subframe 1, a subframe 2, a subframe 3, and a subframe 4 are the first special subframes; or the radio frame includes 10 subframes, where a subframe 0, a subframe 4, a subframe 5, a subframe 6, a subframe 7, a subframe 8, and a subframe 9 are the downlink subframes, and a subframe 1, a subframe 2, and a subframe 3 are the first special subframes; or the radio frame includes 10 subframes, where a subframe 0, a subframe 3, a subframe 4, a subframe 5, a subframe 6, a subframe 7, a subframe 8, and a subframe 9 are the downlink subframes, and a subframe 1 and a subframe 2 are the first special subframes; or the radio frame includes 10 subframes, where a subframe 0, a subframe 5, and a subframe 9 are the downlink subframes, and a subframe 1, a subframe 2, a subframe 3, a subframe 4, a subframe 6, a subframe 7, and a subframe 8 are the first special subframes.

With reference to the second aspect or the first possible implementation of the second aspect, in a fifth possible implementation of the second aspect, the radio frame includes 10 subframes, where a subframe 0 and a subframe 5 are the first special subframes, and a subframe 1, a subframe 2, a subframe 3, a subframe 4, a subframe 6, a subframe 7, a subframe 8, and a subframe 9 are the downlink subframes; or the radio frame includes 10 subframes, where a subframe 0, a subframe 4, a subframe 5, and a subframe 9 are the first special subframes, and a subframe 1, a subframe 2, a subframe 3, a subframe 6, a subframe 7, and a subframe 8 are the downlink subframes; or the radio frame includes 10 subframes, where a subframe 0, a subframe 3, a subframe 4, a subframe 5, a subframe 8, and a subframe 9 are the first special subframes, and a subframe 1, a subframe 2, a subframe 6, and a subframe 7 are the downlink subframes; or the radio frame includes 10 subframes, where a subframe 0, a subframe 5, a subframe 6, a subframe 7, a subframe 8, and a subframe 9 are the first special subframes, and a subframe 1, a subframe 2, a subframe 3, and a subframe 4 are the downlink subframes; or the radio frame includes 10 subframes, where a subframe 0, a subframe 4, a subframe 5, a subframe 6, a subframe 7, a subframe 8, and a subframe 9 are the first special subframes, and a subframe 1, a subframe 2, and a subframe 3 are the downlink subframes; or the radio frame includes 10 subframes, where a subframe 0, a subframe 3, a subframe 4, a subframe 5, a subframe 6, a subframe 7, a subframe 8, and a subframe 9 are the first special subframes, and a subframe 1 and a subframe 2 are the downlink subframes; or the radio frame includes 10 subframes, where a subframe 0, a subframe 5, and a subframe 9 are the first special subframes, and a subframe 1, a subframe 2, a subframe 3, a subframe 4, a subframe 6, a subframe 7, and a subframe 8 are the downlink subframes.

With reference to the second aspect or the first possible implementation of the second aspect, in a sixth possible implementation of the second aspect, the serving cell is a secondary serving cell of user equipment, a subframe position of the at least one first special subframe in the radio frame is one or more of at least one subframe position, and the at least one subframe position is a subframe position corresponding to a downlink subframe in a radio frame in a primary serving cell of the user equipment.

With reference to the second aspect or the first possible implementation of the second aspect, in a seventh possible implementation of the second aspect, the serving cell is a secondary serving cell of user equipment, a subframe position of the at least one first special subframe in the radio frame corresponds to at least one subframe position, and the at least one subframe position is a subframe position corresponding to a downlink subframe in a radio frame in a primary serving cell of the user equipment.

In the present disclosure, firstly, because all subframes in the radio frame in the frame structure corresponding to the serving cell can be used for physical downlink shared channel transmission, spectrum resources are maximally applied to downlink data service transmission to better match a service trend that a downlink data service requirement is far higher than an uplink service requirement. Secondly, because the radio frame in the frame structure corresponding to the serving cell includes the first special subframe, but the first special subframe includes the symbol used for uplink transmission, and the symbol used for uplink transmission may be used for uplink control channel transmission that may specifically include hybrid automatic repeat request-acknowledgement transmission, channel state information transmission, and/or scheduling request transmission, a feedback of uplink control information corresponding to the serving cell may not depend on another serving cell. Therefore, the serving cell deployed with the uplink-downlink configuration can work independently. Thirdly, because the symbol used for uplink transmission and included in the first special subframe may be further used for SRS transmission, performance of massive MIMO in the serving cell can be improved through channel reciprocity, or a gain that link adaptation brings can be increased.

DESCRIPTION OF EMBODIMENTS

To make the objectives, technical solutions, and advantages of this disclosure clearer, the following further describes this disclosure in detail with reference to the accompanying drawings. Apparently, the described embodiments are merely a part rather than all of the embodiments of this disclosure. All other embodiments obtained by persons of ordinary skill in the art based on the embodiments of this disclosure without creative efforts shall fall within the protection scope of this application.

The following further describes the embodiments of the present disclosure in detail with reference to this specification.

The embodiments of the present disclosure are mainly applied to a single-carrier scenario or a multi-carrier aggregation scenario in an LTE system.

Figure 1:
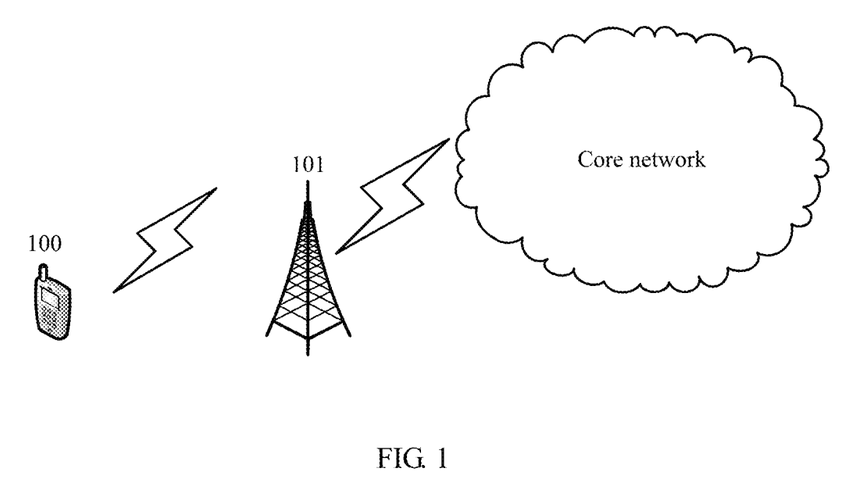
FIG. 1 is a schematic diagram of a communications system according to an embodiment of the present disclosure.

FIG. 1 is a schematic diagram of a communications system to which a technical solution provided by an embodiment of the present disclosure is applicable. The communications system includes user equipment (UE) 100, a base station 101, and a core network. In the technical solution used and provided by this embodiment of the present disclosure, because all subframes in a radio frame in a frame structure corresponding to a serving cell can be used for physical downlink shared channel transmission, spectrum resources are maximally applied to downlink data service transmission to better match a service trend that a downlink data service requirement is far higher than an uplink service requirement.

In addition, because the radio frame in the frame structure corresponding to the serving cell includes a first special subframe, but the first special subframe includes a symbol used for uplink transmission, and the symbol used for uplink transmission may be used for uplink control channel transmission that may specifically include hybrid automatic repeat request-acknowledgement transmission, channel state information transmission, and/or scheduling request transmission, a feedback of uplink control information corresponding to the serving cell may not depend on another serving cell. Therefore, the serving cell deployed with the uplink-downlink configuration can work independently. In addition, because the symbol used for uplink transmission and included in the first special subframe may be further used for SRS transmission, performance of massive MIMO in the serving cell can be improved through channel reciprocity, or a gain that link adaptation brings can be increased.

The following describes in detail the technical solutions provided by the embodiments of the present disclosure.

Figure 2:
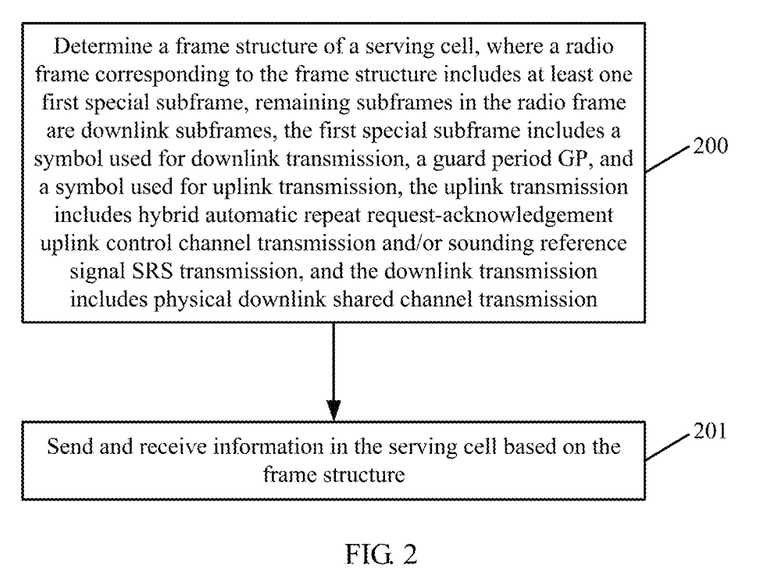
FIG. 2 is a schematic flowchart of a method for sending and receiving information according to an embodiment of the present disclosure.

FIG. 2 is a schematic flowchart of a method for sending and receiving information according to an embodiment of the present disclosure. The method includes the following steps.

Step 200: Determine a frame structure of a serving cell, where a radio frame corresponding to the frame structure includes at least one first special subframe, remaining subframes in the radio frame are downlink subframes, the first special subframe includes a symbol used for downlink transmission, a guard period (GP), and a symbol used for uplink transmission, the uplink transmission includes hybrid automatic repeat request-acknowledgement uplink control channel transmission and/or sounding reference signal (SRS) transmission, and the downlink transmission includes physical downlink shared channel transmission.

Step 201: Send and receive information in the serving cell based on the frame structure.

This embodiment of the present disclosure may be performed by a base station or UE.

Figure 3:
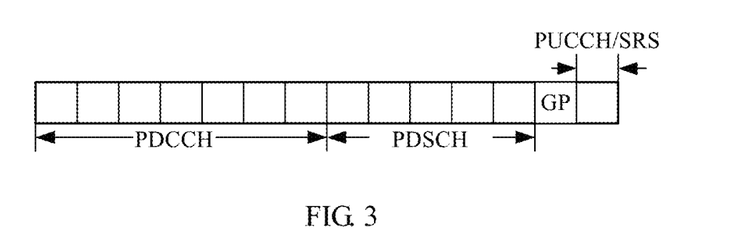
FIG. 3 is a schematic structural diagram of a first special subframe according to an embodiment of the present disclosure.

It should be noted that, a specific subframe structure of the first special subframe is not limited in this embodiment of the present disclosure. FIG. 3 shows a subframe structure of a first special subframe when subframe duration is 1 ms. In the subframe structure shown in FIG. 3, the first special subframe includes 12 symbols used for downlink transmission, a guard period (GP) whose duration is one symbol, and one symbol used for uplink transmission. The symbols used for downlink transmission may be OFDM symbols, and the symbol used for uplink transmission may be an SC-OFDM symbol.

In this embodiment of the present disclosure, the uplink transmission may further include channel state information transmission and/or scheduling request transmission in addition to hybrid automatic repeat request-acknowledgement uplink control channel transmission and/or sounding reference signal (SRS) transmission.

In a specific implementation, a new uplink-downlink configuration is added on a basis of a current uplink-downlink configuration, as shown in Table 3.

TABLE 3

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| x | — | D | S1 | S1 | S1 | S1 | D | S1 | S1 | S1 | S1 |

In Table 3, x is a positive integer greater than 6, S denotes a special subframe, S1 denotes a first special subframe, D denotes a downlink subframe, and U denotes an uplink subframe.

In this embodiment of the present disclosure, an uplink-downlink resource ratio corresponding to an uplink-downlink configuration x is 0:10. It should be noted that, in all embodiments of the present disclosure, the uplink-downlink resource ratio of the serving cell is assumed to be X:Y, and may indicate that a ratio of a quantity of subframes used for physical uplink shared channel transmission to a quantity of subframes used for physical downlink shared channel transmission in the frame structure of the serving cell is X:Y. The uplink-downlink resource ratio corresponding to the uplink-downlink configuration x is 0:10, that is, the quantity of subframes used for physical uplink shared channel transmission is 0, and the quantity of subframes used for physical downlink shared channel transmission is 10. Therefore, all the subframes in the radio frame can be used for physical downlink shared channel transmission to better match a service trend that a downlink data service requirement is far higher than an uplink service requirement.

In addition, because the first special subframe includes the symbol used for uplink transmission, and the symbol used for uplink transmission may be used for carrying uplink control information in uplink control channel transmission, where the uplink control information may include a hybrid automatic repeat request-acknowledgement, channel state information and/or a scheduling request, a feedback of the uplink control information corresponding to the serving cell may not depend on another serving cell. Therefore, the serving cell deployed with the uplink-downlink configuration can work independently. In addition, because the symbol used for uplink transmission may be further used for transmitting a sounding reference signal (SRS), performance of massive MIMO in the serving cell can be improved through channel reciprocity.

Optionally, the frame structure of the serving cell is determined according to the uplink-downlink configuration of the serving cell in step 201. Using Table 3 as an example, if a value of x in Table 3 is 7, and the current uplink-downlink configuration is an uplink-downlink configuration 7, it is determined that the frame structure of the serving cell is a frame structure corresponding to the uplink-downlink configuration 7.

In order that all the subframes in the radio frame may be used for physical downlink shared channel transmission, and that the serving cell can work independently, and that the performance of massive MIMO in the serving cell can be improved through channel reciprocity, optionally, a subframe position of the at least one first special subframe in the radio frame is one or more of at least one subframe position, and the at least one subframe position is a subframe position corresponding to an uplink subframe and a special subframe in a radio frame in an uplink-downlink configuration 0, that is, the subframe position of the first special subframe in the radio frame is a subset of subframe positions corresponding to uplink subframes and special subframes in the radio frame in the uplink-downlink configuration 0.

As can be seen from Table 3, positions of uplink subframes U and special subframes S corresponding to the uplink-downlink configuration 0 are 1, 2, 3, 4, 6, 7, 8, and 9 respectively. In this case, positions of the first special subframes may be 1 and 2, or may be 4, 8, and 9, as long as a set corresponding to the positions of the first special subframes is a subset of a set {1, 2, 3, 4, 6, 7, 8, 9}. When the set corresponding to the positions of the first special subframes is a proper subset of the set {1, 2, 3, 4, 6, 7, 8, 9}, preferably, other positions are downlink subframes. For example, if the positions of the first special subframes are 1 and 2, positions 3, 4, 6, 7, 8, and 9 are downlink subframes. It should be noted that, positions of downlink subframes D corresponding to the uplink-downlink configuration 0 are still downlink subframes.

To simplify the implementation, optionally, a subframe position of the at least one first special subframe in the radio frame corresponds to at least one subframe position, and the at least one subframe position is a subframe position corresponding to an uplink subframe and a special subframe in a radio frame in one of an uplink-downlink configuration 0 to an uplink-downlink configuration 6, that is, the subframe position of the first special subframe in the radio frame is the same as the subframe position corresponding to the uplink subframe and the special subframe in the radio frame in one of the uplink-downlink configuration 0 to the uplink-downlink configuration 6.

It should be noted that, preferably, positions of downlink subframes in the uplink-downlink configuration 0 to the uplink-downlink configuration 6 are still the positions of the downlink subframes in the radio frame including the first special subframe.

Specifically, as shown in Table 4, the radio frame includes 10 subframes, where a subframe 0 and a subframe 5 are the downlink subframes, and a subframe 1, a subframe 2, a subframe 3, a subframe 4, a subframe 6, a subframe 7, a subframe 8, and a subframe 9 are the first special subframes; or a subframe 0, a subframe 4, a subframe 5, and a subframe 9 are the downlink subframes, and a subframe 1, a subframe 2, a subframe 3, a subframe 6, a subframe 7, and a subframe 8 are the first special subframes; or a subframe 0, a subframe 3, a subframe 4, a subframe 5, a subframe 8, and a subframe 9 are the downlink subframes, and a subframe 1, a subframe 2, a subframe 6, and a subframe 7 are the first special subframes; or a subframe 0, a subframe 5, a subframe 6, a subframe 7, a subframe 8, and a subframe 9 are the downlink subframes, and a subframe 1, a subframe 2, a subframe 3, and a subframe 4 are the first special subframes; or a subframe 0, a subframe 4, a subframe 5, a subframe 6, a subframe 7, a subframe 8, and a subframe 9 are the downlink subframes, and a subframe 1, a subframe 2, and a subframe 3 are the first special subframes; or a subframe 0, a subframe 3, a subframe 4, a subframe 5, a subframe 6, a subframe 7, a subframe 8, and a subframe 9 are the downlink subframes, and a subframe 1 and a subframe 2 are the first special subframes; or a subframe 0, a subframe 5, and a subframe 9 are the downlink subframes, and a subframe 1, a subframe 2, a subframe 3, a subframe 4, a subframe 6, a subframe 7, and a subframe 8 are the first special subframes.

TABLE 4

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 7 | — | D | S1 | S1 | S1 | S1 | D | S1 | S1 | S1 | S1 |
| 8 | — | D | S1 | S1 | S1 | D | D | S1 | S1 | S1 | D |
| 9 | — | D | S1 | S1 | D | D | D | S1 | S1 | D | D |
| 10 | — | D | S1 | S1 | S1 | S1 | D | D | D | D | D |
| 11 | — | D | S1 | S1 | S1 | D | D | D | D | D | D |
| 12 | — | D | S1 | S1 | D | D | D | D | D | D | D |
| 13 | — | D | S1 | S1 | S1 | S1 | D | S1 | S1 | S1 | D |

Positions of first special subframes S1 in an uplink-downlink configuration 7 are the same as positions of uplink subframes 0 and special subframes S in an uplink-downlink configuration 0; positions of first special subframes S1 in an uplink-downlink configuration 8 are the same as positions of uplink subframes 0 and special subframes S in an uplink-downlink configuration 1; positions of first special subframes S1 in an uplink-downlink configuration 9 are the same as positions of uplink subframes 0 and special subframes S in an uplink-downlink configuration 2; positions of first special subframes S1 in an uplink-downlink configuration 10 are the same as positions of uplink subframes 0 and a special subframe S in an uplink-downlink configuration 3; positions of first special subframes S1 in an uplink-downlink configuration 11 are the same as positions of uplink subframes 0 and a special subframe S in an uplink-downlink configuration 4; positions of first special subframes S1 in an uplink-downlink configuration 12 are the same as positions of uplink subframes 0 and a special subframe S in an uplink-downlink configuration 5; and positions of first special subframes S1 in an uplink-downlink configuration 13 are the same as positions of uplink subframes 0 and special subframes S in an uplink-downlink configuration 6. It should be noted that, the subframe structure is described merely by using a correspondence between the uplink-downlink configuration x (the value of x is 7, 8, 9, . . . , 13) and the subframe structure and the value of x as an example. However, the present disclosure is not limited to the value of x and the correspondence between the uplink-downlink configuration x and the subframe structure in Table 4.

Because the subframe position of the first special subframe in the radio frame is a subset of the subframe positions corresponding to the uplink subframes and the special subframes in the radio frame in the uplink-downlink configuration 0, or the subframe position of the first special subframe in the radio frame is the same as the subframe position corresponding to the uplink subframe and the special subframe in the radio frame in one of the uplink-downlink configuration 0 to the uplink-downlink configuration 6, when the serving cell is configured to feed back the uplink control information such as the periodic channel state information and/or the sounding reference signal (SRS), a corresponding mechanism of an existing LTE system may be reused, and standard complexity and implementation complexity are reduced. In addition, the uplink control information and/or the SRS of the serving cell are/is protected against interference from a downlink signal of a neighboring cell. This is because regardless of an uplink-downlink configuration of the neighboring cell, the uplink control information and/or the SRS of the serving cell collide/collides with uplink transmission in the neighboring cell only. However, because little interference is caused by a collision with the uplink transmission in the neighboring cell, the interference may be ignored.

When the serving cell is a secondary serving cell of user equipment, optionally, the serving cell is the secondary serving cell of the user equipment, a subframe position of the at least one first special subframe in the radio frame is one or more of at least one subframe position, and the at least one subframe position is a subframe position corresponding to a downlink subframe in a radio frame in a primary serving cell of the user equipment. That is, the subframe position of the first special subframe in the radio frame is a subset of subframe positions corresponding to downlink subframes in the radio frame in the primary serving cell of the user equipment, where other positions in the radio frame including the first special subframe are downlink subframes.

Specifically, when a frame structure of the radio frame in the primary serving cell of the user equipment is a radio frame structure corresponding to the uplink-downlink configuration 13 as shown in Table 4, the radio frame structure in the secondary serving cell of the user equipment is shown in Table 5.

TABLE 5

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 14 | — | S1 | D | D | D | D | D | D | D | D | D |
| 15 | — | D | D | D | D | D | S1 | D | D | D | D |
| 16 | — | S1 | D | D | D | D | S1 | D | D | D | D |

The subframe structure is described merely by using a correspondence between the uplink-downlink configuration x (the value of x is 14, 15, 16) and the subframe structure and the value of x as an example. However, the present disclosure is not limited to the value of x and the correspondence between the uplink-downlink configuration x and the subframe structure in Table 5.

To simplify the implementation, when the serving cell is a secondary serving cell of user equipment, optionally, the serving cell is the secondary serving cell of the user equipment, a subframe position of the at least one first special subframe in the radio frame corresponds to at least one subframe position, and the at least one subframe position is a subframe position corresponding to a downlink subframe in a radio frame in a primary serving cell of the user equipment. That is, the subframe position of the first special subframe in the radio frame is the same as the subframe position corresponding to the downlink subframe in the radio frame in the primary serving cell of the user equipment, and the position of the downlink subframe is the same as the subframe position corresponding to the downlink subframe in the radio frame in the primary serving cell of the user equipment.

Specifically, when the frame structure of the radio frame in the primary serving cell of the user equipment is a radio frame structure corresponding to the uplink-downlink configuration 0, in the radio frame in the secondary serving cell, a subframe 0 and a subframe 5 are the first special subframes, and a subframe 1, a subframe 2, a subframe 3, a subframe 4, a subframe 6, a subframe 7, a subframe 8, and a subframe 9 are the downlink subframes;

when the frame structure of the radio frame in the primary serving cell of the user equipment is a radio frame structure corresponding to the uplink-downlink configuration 1, in the radio frame in the secondary serving cell, a subframe 0, a subframe 4, a subframe 5, and a subframe 9 are the first special subframes, and a subframe 1, a subframe 2, a subframe 3, a subframe 6, a subframe 7, and a subframe 8 are the downlink subframes;

when the frame structure of the radio frame in the primary serving cell of the user equipment is a radio frame structure corresponding to the uplink-downlink configuration 2, in the radio frame in the secondary serving cell, a subframe 0, a subframe 3, a subframe 4, a subframe 5, a subframe 8, and a subframe 9 are the special subframes, and a subframe 1, a subframe 2, a subframe 6, and a subframe 7 are the downlink subframes;

when the frame structure of the radio frame in the primary serving cell of the user equipment is a radio frame structure corresponding to the uplink-downlink configuration 3, in the radio frame in the secondary serving cell, a subframe 0, a subframe 5, a subframe 6, a subframe 7, a subframe 8, and a subframe 9 are the special subframes, and a subframe 1, a subframe 2, a subframe 3, and a subframe 4 are the downlink subframes;

when the frame structure of the radio frame in the primary serving cell of the user equipment is a radio frame structure corresponding to the uplink-downlink configuration 4, in the radio frame in the secondary serving cell, a subframe 0, a subframe 4, a subframe 5, a subframe 6, a subframe 7, a subframe 8, and a subframe 9 are the special subframes, and a subframe 1, a subframe 2, and a subframe 3 are the downlink subframes;

when the frame structure of the radio frame in the primary serving cell of the user equipment is a radio frame structure corresponding to the uplink-downlink configuration 5, in the radio frame in the secondary serving cell, a subframe 0, a subframe 3, a subframe 4, a subframe 5, a subframe 6, a subframe 7, a subframe 8, and a subframe 9 are the special subframes, and a subframe 1 and a subframe 2 are the downlink subframes; or when the frame structure of the radio frame in the primary serving cell of the user equipment is a radio frame structure corresponding to the uplink-downlink configuration 6, in the radio frame in the secondary serving cell, a subframe 0, a subframe 5, and a subframe 9 are the special subframes, and a subframe 1, a subframe 2, a subframe 3, a subframe 4, a subframe 6, a subframe 7, and a subframe 8 are the downlink subframes.

Therefore, when the serving cell is the secondary serving cell of the user equipment, because the subframe position of the first special subframe in the radio frame is a subset of subframe positions corresponding to downlink subframes in the radio frame in the primary serving cell of the user equipment, or the subframe position of the first special subframe in the radio frame is the same as a subframe position corresponding to a downlink subframe in the radio frame in the primary serving cell of the user equipment, the uplink control information and/or the sounding reference signal (SRS) sent by the user equipment in the first special subframe of the serving cell to a base station do/does not collide with uplink transmission in the primary serving cell of the user equipment. On one hand, this can avoid discarding the uplink control information and/or the sounding reference signal (SRS) due to a collision with the uplink transmission in the primary serving cell when power is limited; on the other hand, performance is ensured because there is no need to divide power with the uplink transmission in the primary serving cell. In addition, for user equipment that does not have an uplink carrier aggregation capability, because the first special subframe of the serving cell collides only with a downlink subframe of the primary serving cell, uplink transmission may be performed in the secondary serving cell when the primary serving cell has a downlink subframe, or uplink transmission is performed in the primary serving cell when the primary serving cell has an uplink subframe. Therefore, user equipment that has only an uplink single-carrier capability can also transmit uplink control information and/or an SRS in the secondary serving cell, and a gain that link adaptation brings is increased.

Duration of each subframe in the frame structure of the serving cell is not limited in this embodiment of the present disclosure. Preferably, the duration of each subframe is 1 ms.

Based on a same inventive concept, an embodiment of the present disclosure further provides a device for sending and receiving information. A method corresponding to the device for sending and receiving information in this embodiment of the present disclosure is the method for sending and receiving information. Therefore, for an implementation of the device in this embodiment of the present disclosure, refer to the implementation of the method. No repetition is provided.

Figure 4:
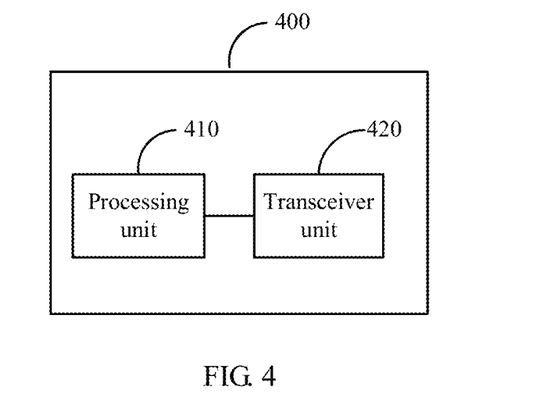
FIG. 4 is a schematic structural diagram of a device for sending and receiving information according to an embodiment of the present disclosure.

According to a schematic diagram of a device 400 for sending and receiving information according to an embodiment of the present disclosure. The device 400 includes a processing unit 410 and a transceiver unit 420. It should be understood that, the device 400 may be UE, or may be a base station.

The processing unit 410 is configured to determine a frame structure of a serving cell. A radio frame corresponding to the frame structure includes at least one first special subframe, remaining subframes in the radio frame are downlink subframes, the first special subframe includes a symbol used for downlink transmission, a guard period (GP), and a symbol used for uplink transmission, the uplink transmission includes hybrid automatic repeat request-acknowledgement uplink control channel transmission and/or sounding reference signal (SRS) transmission, and the downlink transmission includes physical downlink shared channel transmission.

The transceiver unit 420 is configured to send and receive information in the serving cell based on the frame structure.

Optionally, the processing unit 410 is specifically configured to:

determine the frame structure of the serving cell according to an uplink-downlink configuration of the serving cell, where an uplink-downlink configuration index corresponding to the uplink-downlink configuration is x, and x is a positive integer greater than 6.

Optionally, a subframe position of the at least one first special subframe in the radio frame is one or more of at least one subframe position, and the at least one subframe position is a subframe position corresponding to an uplink subframe and a special subframe in a radio frame in an uplink-downlink configuration 0.

Optionally, a subframe position of the at least one first special subframe in the radio frame corresponds to at least one subframe position, and the at least one subframe position is a subframe position corresponding to an uplink subframe and a special subframe in a radio frame in one of an uplink-downlink configuration 0 to an uplink-downlink configuration 6.

Optionally, the radio frame includes 10 subframes, where a subframe 0 and a subframe 5 are the downlink subframes, and a subframe 1, a subframe 2, a subframe 3, a subframe 4, a subframe 6, a subframe 7, a subframe 8, and a subframe 9 are the first special subframes; or the radio frame includes 10 subframes, where a subframe 0, a subframe 4, a subframe 5, and a subframe 9 are the downlink subframes, and a subframe 1, a subframe 2, a subframe 3, a subframe 6, a subframe 7, and a subframe 8 are the first special subframes; or the radio frame includes 10 subframes, where a subframe 0, a subframe 3, a subframe 4, a subframe 5, a subframe 8, and a subframe 9 are the downlink subframes, and a subframe 1, a subframe 2, a subframe 6, and a subframe 7 are the first special subframes; or the radio frame includes 10 subframes, where a subframe 0, a subframe 5, a subframe 6, a subframe 7, a subframe 8, and a subframe 9 are the downlink subframes, and a subframe 1, a subframe 2, a subframe 3, and a subframe 4 are the first special subframes; or the radio frame includes 10 subframes, where a subframe 0, a subframe 4, a subframe 5, a subframe 6, a subframe 7, a subframe 8, and a subframe 9 are the downlink subframes, and a subframe 1, a subframe 2, and a subframe 3 are the first special subframes; or the radio frame includes 10 subframes, where a subframe 0, a subframe 3, a subframe 4, a subframe 5, a subframe 6, a subframe 7, a subframe 8, and a subframe 9 are the downlink subframes, and a subframe 1 and a subframe 2 are the first special subframes; or the radio frame includes 10 subframes, where a subframe 0, a subframe 5, and a subframe 9 are the downlink subframes, and a subframe 1, a subframe 2, a subframe 3, a subframe 4, a subframe 6, a subframe 7, and a subframe 8 are the first special subframes.

Optionally, the radio frame includes 10 subframes, where a subframe 0 and a subframe 5 are the first special subframes, and a subframe 1, a subframe 2, a subframe 3, a subframe 4, a subframe 6, a subframe 7, a subframe 8, and a subframe 9 are the downlink subframes; or the radio frame includes 10 subframes, where a subframe 0, a subframe 4, a subframe 5, and a subframe 9 are the first special subframes, and a subframe 1, a subframe 2, a subframe 3, a subframe 6, a subframe 7, and a subframe 8 are the downlink subframes; or the radio frame includes 10 subframes, where a subframe 0, a subframe 3, a subframe 4, a subframe 5, a subframe 8, and a subframe 9 are the first special subframes, and a subframe 1, a subframe 2, a subframe 6, and a subframe 7 are the downlink subframes; or the radio frame includes 10 subframes, where a subframe 0, a subframe 5, a subframe 6, a subframe 7, a subframe 8, and a subframe 9 are the first special subframes, and a subframe 1, a subframe 2, a subframe 3, and a subframe 4 are the downlink subframes; or the radio frame includes 10 subframes, where a subframe 0, a subframe 4, a subframe 5, a subframe 6, a subframe 7, a subframe 8, and a subframe 9 are the first special subframes, and a subframe 1, a subframe 2, and a subframe 3 are the downlink subframes; or the radio frame includes 10 subframes, where a subframe 0, a subframe 3, a subframe 4, a subframe 5, a subframe 6, a subframe 7, a subframe 8, and a subframe 9 are the first special subframes, and a subframe 1 and a subframe 2 are the downlink subframes; or the radio frame includes 10 subframes, where a subframe 0, a subframe 5, and a subframe 9 are the first special subframes, and a subframe 1, a subframe 2, a subframe 3, a subframe 4, a subframe 6, a subframe 7, and a subframe 8 are the downlink subframes.

Optionally, the serving cell is a secondary serving cell of user equipment, a subframe position of the at least one first special subframe in the radio frame is one or more of at least one subframe position, and the at least one subframe position is a subframe position corresponding to a downlink subframe in a radio frame in a primary serving cell of the user equipment.

Optionally, the serving cell is a secondary serving cell of user equipment, a subframe position of the at least one first special subframe in the radio frame corresponds to at least one subframe position, and the at least one subframe position is a subframe position corresponding to a downlink subframe in a radio frame in a primary serving cell of the user equipment.

Figure 5:
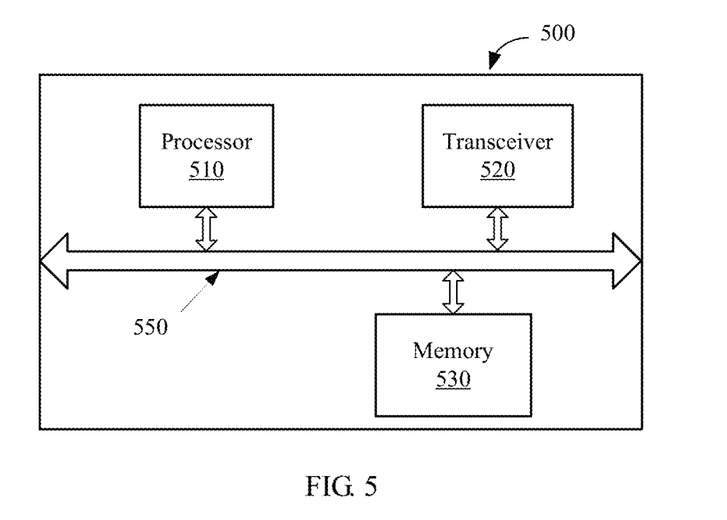
FIG. 5 is a schematic structural diagram of a device for sending and receiving information according to another embodiment of the present disclosure.

It should be noted that, in this embodiment of the present disclosure, the processing unit 410 may be implemented by a processor, and the transceiver unit 420 may be implemented by a transceiver. As shown in FIG. 5, a device 500 for sending and receiving information may include a processor 510, a transceiver 520, and a memory 530. The memory 530 may be configured to store a program/code preinstalled when the device 500 is delivered from a factory, or may store code executed by the processor 510.

Components in the device 500 are coupled together by using a bus system 550. The bus system 550 further includes a power bus, a control bus, and a status signal bus, in addition to a data bus.

It should be noted that, the processor 510 and the transceiver 520 may be a processor and a transceiver in a base station, or may be a processor and a transceiver in UE.

The processor 510 may be a general-purpose central processing unit (CPU), a microprocessor, an application-specific integrated circuit (ASIC), or one or more integrated circuits, and is configured to perform related operations to implement a technical solution provided in an embodiment of the present disclosure.

It should be noted that, although the device shown in FIG. 5 includes only the processor 510, the transceiver 520, and the memory 530, in a specific implementation process, persons skilled in the art should understand that the device further includes other components required for normal running. In addition, persons skilled in the art should understand that, according to specific requirements, the device may further include hardware components for implementing other additional functions. In addition, persons skilled in the art should understand that, the device may also include only the components or modules that are necessary for implementing this embodiment of the present disclosure, and does not necessarily include all the components shown in FIG. 5.

Persons of ordinary skill in the art may understand that all or some of the processes in the foregoing method embodiment may be implemented by related hardware instructed by a computer program. The program may be stored in a computer readable storage medium. When the program is executed, the processes of the foregoing method embodiment may be performed. The storage medium may be a magnetic disk, an optical disc, a read-only memory (ROM), or a random access memory (RAM).

As can be seen from above, in this embodiment of the present disclosure, a frame structure of a serving cell is determined, where a radio frame corresponding to the frame structure includes at least one first special subframe, remaining subframes in the radio frame are downlink subframes, the first special subframe includes a symbol used for downlink transmission, a guard period (GP), and a symbol used for uplink transmission, the uplink transmission includes hybrid automatic repeat request-acknowledgement uplink control channel transmission and/or sounding reference signal (SRS) transmission, and the downlink transmission includes physical downlink shared channel transmission; and information is sent and received in the serving cell based on the frame structure. In the technical solution, on one hand, because all subframes in the radio frame in the frame structure corresponding to the serving cell can be used for physical downlink shared channel transmission, spectrum resources are maximally applied to downlink data service transmission to better match a service trend that a downlink data service requirement is far higher than an uplink service requirement. On the other hand, because the radio frame in the frame structure corresponding to the serving cell includes the first special subframe, but the first special subframe includes the symbol used for uplink transmission, and the symbol used for uplink transmission may be used for uplink control channel transmission that may specifically include hybrid automatic repeat request-acknowledgement transmission, channel state information transmission, and/or scheduling request transmission, a feedback of uplink control information corresponding to the serving cell may not depend on another serving cell. Therefore, the serving cell deployed with the uplink-downlink configuration can work independently. In addition, because the symbol used for uplink transmission and included in the first special subframe may be further used for SRS transmission, performance of massive MIMO in the serving cell can be improved through channel reciprocity, or a gain that link adaptation brings can be increased.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for sending and receiving information, comprising:
    determining a frame structure of a serving cell, wherein a radio frame corresponding to the frame structure comprises at least one first special subframe, remaining subframes in the radio frame are downlink subframes, the first special subframe comprises a symbol used for downlink transmission, a guard period (GP), and a symbol used for uplink transmission, the uplink transmission comprises hybrid automatic repeat request-acknowledgement uplink control channel transmission and/or sounding reference signal (SRS) transmission, and the downlink transmission comprises physical downlink shared channel transmission; and
    sending and receiving information in the serving cell based on the frame structure, wherein a subframe position of the at least one first special subframe in the radio frame corresponds to at least one subframe position, wherein 1) when the serving cell is a primary cell, the at least one subframe position corresponds to a subframe position of an uplink subframe or a special subframe in a radio frame in one of uplink-downlink configurations 0 to 6, and 2) when the serving cell is a secondary cell, the at least one subframe position corresponds to a subframe position of a downlink subframe in a radio frame in one of the uplink-downlink configurations 0 to 6, and wherein each subframe position of two or more first special subframes in the radio from corresponds to a subframe position of an uplink subframe or a special subframe in a radio frame in one of an uplink-downlink configuration 0 to an uplink-downlink configuration 6.

2. The method according to claim 1, wherein the determining a frame structure of a serving cell comprises:
determining the frame structure of the serving cell according to an uplink-downlink configuration of the serving cell, wherein an uplink-downlink configuration index corresponding to the uplink-downlink configuration is x, and x is a positive integer greater than 6.

3. The method according to claim 1, wherein each subframe position of two or more first special subframes in the radio frame corresponds to a subframe position of an uplink subframe or a special subframe in a radio frame in an uplink-downlink configuration 0.

4. The method according to claim 1, wherein
the radio frame comprises 10 subframes, wherein a subframe 0 and a subframe 5 are the downlink subframes, and a subframe 1, a subframe 2, a subframe 3, a subframe 4, a subframe 6, a subframe 7, a subframe 8, and a subframe 9 are the first special subframes; or
the radio frame comprises 10 subframes, wherein a subframe 0, a subframe 4, a subframe 5, and a subframe 9 are the downlink subframes, and a subframe 1, a subframe 2, a subframe 3, a subframe 6, a subframe 7, and a subframe 8 are the first special subframes; or
the radio frame comprises 10 subframes, wherein a subframe 0, a subframe 3, a subframe 4, a subframe 5, a subframe 8, and a subframe 9 are the downlink subframes, and a subframe 1, a subframe 2, a subframe 6, and a subframe 7 are the first special subframes; or
the radio frame comprises 10 subframes, wherein a subframe 0, a subframe 5, a subframe 6, a subframe 7, a subframe 8, and a subframe 9 are the downlink subframes, and a subframe 1, a subframe 2, a subframe 3, and a subframe 4 are the first special subframes; or
the radio frame comprises 10 subframes, wherein a subframe 0, a subframe 4, a subframe 5, a subframe 6, a subframe 7, a subframe 8, and a subframe 9 are the downlink subframes, and a subframe 1, a subframe 2, and a subframe 3 are the first special subframes; or
the radio frame comprises 10 subframes, wherein a subframe 0, a subframe 3, a subframe 4, a subframe 5, a subframe 6, a subframe 7, a subframe 8, and a subframe 9 are the downlink subframes, and a subframe 1 and a subframe 2 are the first special subframes; or
the radio frame comprises 10 subframes, wherein a subframe 0, a subframe 5, and a subframe 9 are the downlink subframes, and a subframe 1, a subframe 2, a subframe 3, a subframe 4, a subframe 6, a subframe 7, and a subframe 8 are the first special subframes.

5. The method according to claim 1, wherein
the radio frame comprises 10 subframes, wherein a subframe 0 and a subframe 5 are the first special subframes, and a subframe 1, a subframe 2, a subframe 3, a subframe 4, a subframe 6, a subframe 7, a subframe 8, and a subframe 9 are the downlink subframes; or
the radio frame comprises 10 subframes, wherein a subframe 0, a subframe 4, a subframe 5, and a subframe 9 are the first special subframes, and a subframe 1, a subframe 2, a subframe 3, a subframe 6, a subframe 7, and a subframe 8 are the downlink subframes; or
the radio frame comprises 10 subframes, wherein a subframe 0, a subframe 3, a subframe 4, a subframe 5, a subframe 8, and a subframe 9 are the first special subframes, and a subframe 1, a subframe 2, a subframe 6, and a subframe 7 are the downlink subframes; or
the radio frame comprises 10 subframes, wherein a subframe 0, a subframe 5, a subframe 6, a subframe 7, a subframe 8, and a subframe 9 are the first special subframes, and a subframe 1, a subframe 2, a subframe 3, and a subframe 4 are the downlink subframes; or
the radio frame comprises 10 subframes, wherein a subframe 0, a subframe 4, a subframe 5, a subframe 6, a subframe 7, a subframe 8, and a subframe 9 are the first special subframes, and a subframe 1, a subframe 2, and a subframe 3 are the downlink subframes; or
the radio frame comprises 10 subframes, wherein a subframe 0, a subframe 3, a subframe 4, a subframe 5, a subframe 6, a subframe 7, a subframe 8, and a subframe 9 are the first special subframes, and a subframe 1 and a subframe 2 are the downlink subframes; or
the radio frame comprises 10 subframes, wherein a subframe 0, a subframe 5, and a subframe 9 are the first special subframes, and a subframe 1, a subframe 2, a subframe 3, a subframe 4, a subframe 6, a subframe 7, and a subframe 8 are the downlink subframes.

6. The method according to claim 1, wherein the serving cell is a secondary serving cell of user equipment, a subframe position of the at least one first special subframe in the radio frame is one or more of at least one subframe position, and the at least one subframe position is a subframe position corresponding to a downlink subframe in a radio frame in a primary serving cell of the user equipment.

7. The method according to claim 1, wherein the serving cell is a secondary serving cell of user equipment, a subframe position of the at least one first special subframe in the radio frame corresponds to at least one subframe position, and the at least one subframe position is a subframe position corresponding to a downlink subframe in a radio frame in a primary serving cell of the user equipment.

8. A device for sending and receiving information, comprising:
a processing unit, configured to determine a frame structure of a serving cell, wherein a radio frame corresponding to the frame structure comprises at least one first special subframe, remaining subframes in the radio frame are downlink subframes, the first special subframe comprises a symbol used for downlink transmission, a guard period (GP), and a symbol used for uplink transmission, the uplink transmission comprises hybrid automatic repeat request-acknowledgement uplink control channel transmission and/or sounding reference signal (SRS) transmission, and the downlink transmission comprises physical downlink shared channel transmission; and
a transceiver unit, configured to send and receive information in the serving cell based on the frame structure,
wherein a subframe position of the at least one first special subframe in the radio frame corresponds to at least one subframe position, wherein 1) when the serving cell is a primary cell, the at least one subframe position corresponds to a subframe position of an uplink subframe or a special subframe in a radio frame in one of uplink-downlink configurations 0 to 6, and 2) when the serving cell is a secondary cell, the at least one subframe position corresponds to a subframe position of a downlink subframe in a radio frame in one of the uplink-downlink configurations 0 to 6, and
wherein each subframe position of two or more first special subframes in the radio from corresponds to a subframe position of an uplink subframe or a special subframe in a radio frame in one of an uplink-downlink configuration 0 to an uplink-downlink configuration 6.

9. The device according to claim 8, wherein the processing unit is specifically configured to:
determine the frame structure of the serving cell according to an uplink-downlink configuration of the serving cell, wherein an uplink-downlink configuration index corresponding to the uplink-downlink configuration is x, and x is a positive integer greater than 6.

10. The device according to claim 8, wherein each subframe position of two or more first special subframes in the radio frame is corresponds to a subframe position of an uplink subframe or a special subframe in a radio frame in an uplink-downlink configuration 0.

11. The device according to claim 8, wherein
the radio frame comprises 10 subframes, wherein a subframe 0 and a subframe 5 are the downlink subframes, and a subframe 1, a subframe 2, a subframe 3, a subframe 4, a subframe 6, a subframe 7, a subframe 8, and a subframe 9 are the first special subframes; or
the radio frame comprises 10 subframes, wherein a subframe 0, a subframe 4, a subframe 5, and a subframe 9 are the downlink subframes, and a subframe 1, a subframe 2, a subframe 3, a subframe 6, a subframe 7, and a subframe 8 are the first special subframes; or
the radio frame comprises 10 subframes, wherein a subframe 0, a subframe 3, a subframe 4, a subframe 5, a subframe 8, and a subframe 9 are the downlink subframes, and a subframe 1, a subframe 2, a subframe 6, and a subframe 7 are the first special subframes; or
the radio frame comprises 10 subframes, wherein a subframe 0, a subframe 5, a subframe 6, a subframe 7, a subframe 8, and a subframe 9 are the downlink subframes, and a subframe 1, a subframe 2, a subframe 3, and a subframe 4 are the first special subframes; or
the radio frame comprises 10 subframes, wherein a subframe 0, a subframe 4, a subframe 5, a subframe 6, a subframe 7, a subframe 8, and a subframe 9 are the downlink subframes, and a subframe 1, a subframe 2, and a subframe 3 are the first special subframes; or
the radio frame comprises 10 subframes, wherein a subframe 0, a subframe 3, a subframe 4, a subframe 5, a subframe 6, a subframe 7, a subframe 8, and a subframe 9 are the downlink subframes, and a subframe 1 and a subframe 2 are the first special subframes; or
the radio frame comprises 10 subframes, wherein a subframe 0, a subframe 5, and a subframe 9 are the downlink subframes, and a subframe 1, a subframe 2, a subframe 3, a subframe 4, a subframe 6, a subframe 7, and a subframe 8 are the first special subframes.

12. The device according to claim 8, wherein
the radio frame comprises 10 subframes, wherein a subframe 0 and a subframe 5 are the first special subframes, and a subframe 1, a subframe 2, a subframe 3, a subframe 4, a subframe 6, a subframe 7, a subframe 8, and a subframe 9 are the downlink subframes; or
the radio frame comprises 10 subframes, wherein a subframe 0, a subframe 4, a subframe 5, and a subframe 9 are the first special subframes, and a subframe 1, a subframe 2, a subframe 3, a subframe 6, a subframe 7, and a subframe 8 are the downlink subframes; or
the radio frame comprises 10 subframes, wherein a subframe 0, a subframe 3, a subframe 4, a subframe 5, a subframe 8, and a subframe 9 are the first special subframes, and a subframe 1, a subframe 2, a subframe 6, and a subframe 7 are the downlink subframes; or
the radio frame comprises 10 subframes, wherein a subframe 0, a subframe 5, a subframe 6, a subframe 7, a subframe 8, and a subframe 9 are the first special subframes, and a subframe 1, a subframe 2, a subframe 3, and a subframe 4 are the downlink subframes; or
the radio frame comprises 10 subframes, wherein a subframe 0, a subframe 4, a subframe 5, a subframe 6, a subframe 7, a subframe 8, and a subframe 9 are the first special subframes, and a subframe 1, a subframe 2, and a subframe 3 are the downlink subframes; or
the radio frame comprises 10 subframes, wherein a subframe 0, a subframe 3, a subframe 4, a subframe 5, a subframe 6, a subframe 7, a subframe 8, and a subframe 9 are the first special subframes, and a subframe 1 and a subframe 2 are the downlink subframes; or
the radio frame comprises 10 subframes, wherein a subframe 0, a subframe 5, and a subframe 9 are the first special subframes, and a subframe 1, a subframe 2, a subframe 3, a subframe 4, a subframe 6, a subframe 7, and a subframe 8 are the downlink subframes.

13. The device according to claim 8, wherein the serving cell is a secondary serving cell of user equipment, a subframe position of the at least one first special subframe in the radio frame is one or more of at least one subframe position, and the at least one subframe position is a subframe position corresponding to a downlink subframe in a radio frame in a primary serving cell of the user equipment.

14. The device according to claim 8, wherein the serving cell is a secondary serving cell of user equipment, a subframe position of the at least one first special subframe in the radio frame corresponds to at least one subframe position, and the at least one subframe position is a subframe position corresponding to a downlink subframe in a radio frame in a primary serving cell of the user equipment.

15. A non-transitory computer-readable medium comprising code which, when executed by a processor, causes the processor to perform a method comprising:
determining a frame structure of a serving cell, wherein a radio frame corresponding to the frame structure comprises at least one first special subframe, remaining subframes in the radio frame are downlink subframes, the first special subframe comprises a symbol used for downlink transmission, a guard period (GP), and a symbol used for uplink transmission, the uplink transmission comprises hybrid automatic repeat request-acknowledgement uplink control channel transmission and/or sounding reference signal (SRS) transmission, and the downlink transmission comprises physical downlink shared channel transmission; and
sending and receiving information in the serving cell based on the frame structure, wherein a subframe position of the at least one first special subframe in the radio frame corresponds to at least one subframe position, wherein 1) when the serving cell is a primary cell, the at least one subframe position corresponds to a subframe position of an uplink subframe or a special subframe in a radio frame in one of uplink-downlink configurations 0 to 6, and 2) when the serving cell is a secondary cell, the at least one subframe position corresponds to a subframe position of a downlink subframe in a radio frame in one of the uplink-downlink configurations 0 to 6, and wherein each subframe position of two or more first special subframes in the radio from corresponds to a subframe position of an uplink subframe or a special subframe in a radio frame in one of an uplink-downlink configuration 0 to an uplink-downlink configuration 6.

16. The non-transitory computer-readable medium according to claim 15, wherein the determining a frame structure of a serving cell comprises:
determining the frame structure of the serving cell according to an uplink-downlink configuration of the serving cell, wherein an uplink-downlink configuration index corresponding to the uplink-downlink configuration is x, and x is a positive integer greater than 6.

17. The non-transitory computer-readable medium according to claim 15, wherein each subframe position of two or more first special subframes in the radio frame corresponds to a subframe position of an uplink subframe or a special subframe in a radio frame in an uplink-downlink configuration 0.

* * * * *

UNITED STATES PATENT AND TRADEMARK OFFICE
CERTIFICATE OF CORRECTION

PATENT NO. : 10,797,761 B2
APPLICATION NO. : 15/995666
DATED : October 6, 2020
INVENTOR(S) : Yan Cheng and Lixia Xue Page 1 of 1

It is certified that error appears in the above-identified patent and that said Letters Patent is hereby corrected as shown below:

In the Claims

In Claim 1, Column 18, Line 64, delete "radio from corresponds" and insert --radio frame corresponds--.

In Claim 8, Column 20, Line 60, delete "radio from corresponds" and insert --radio frame corresponds--.

In Claim 15, Column 22, Line 58, delete "radio from corresponds" and insert --radio frame corresponds--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*